April 29, 1947.　　　　J. A. DISSE　　　2,419,887
UNIVERSAL VISE
Filed Sept. 13, 1943　　　3 Sheets-Sheet 1
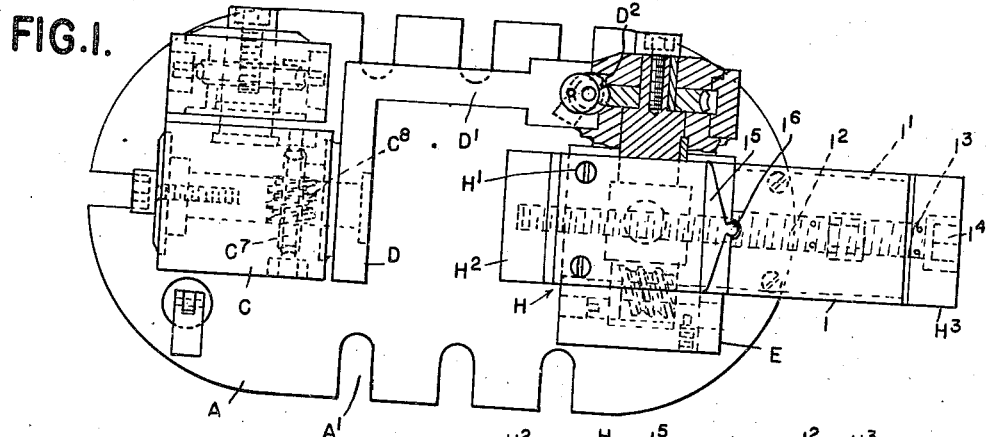
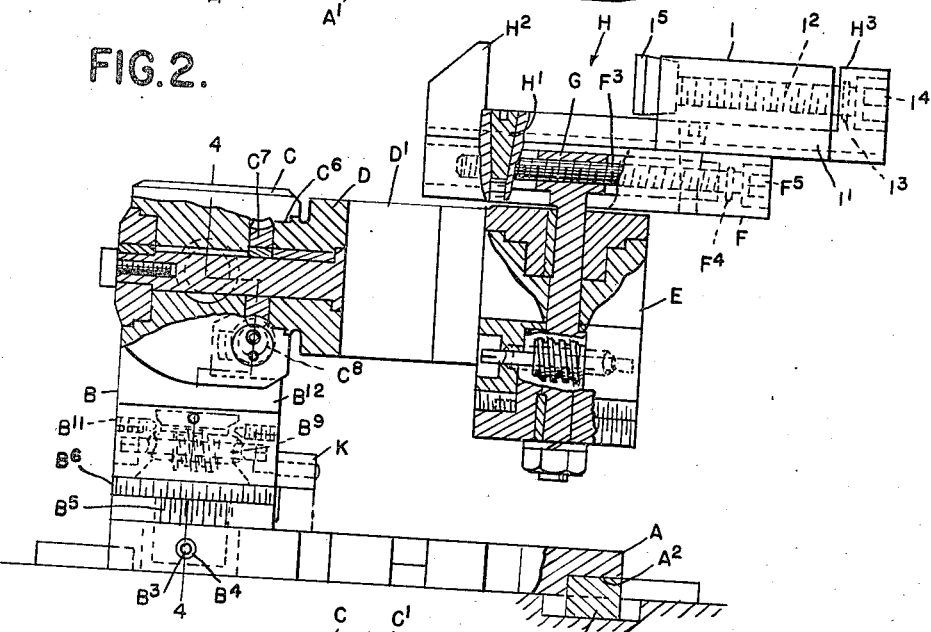
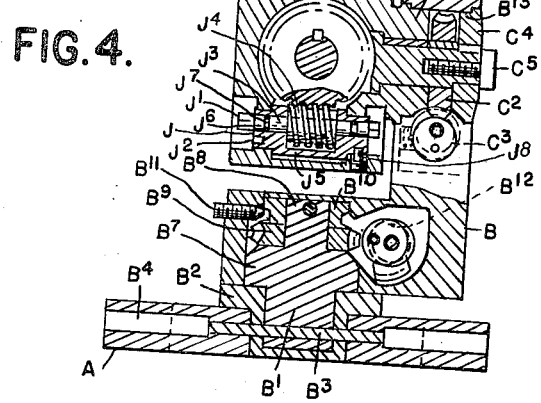
INVENTOR.
JOSEF A. DISSE
BY
Whittemore Hulbert + Belknap
ATTORNEYS April 29, 1947.                J. A. DISSE                2,419,887
                              UNIVERSAL VISE
           Filed Sept. 13, 1943                    3 Sheets-Sheet 2
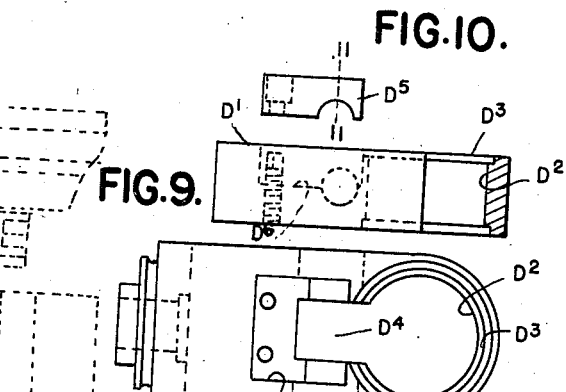
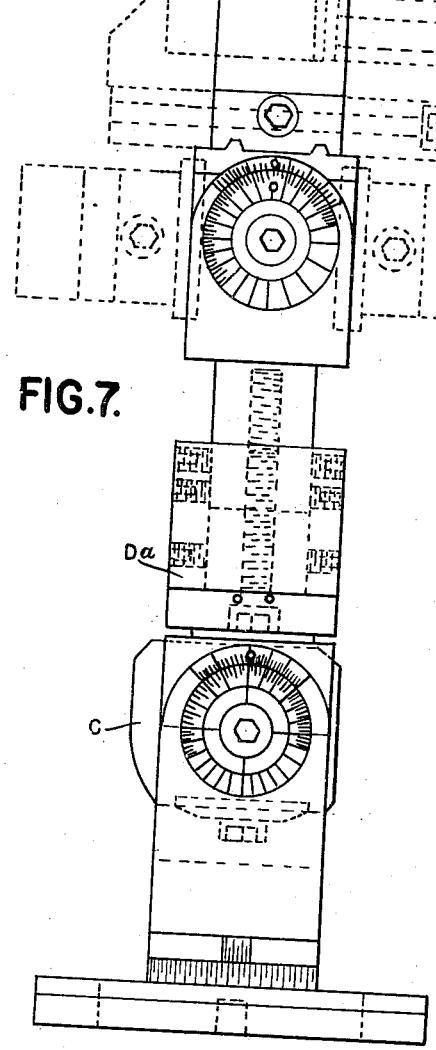
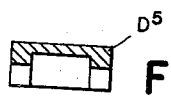
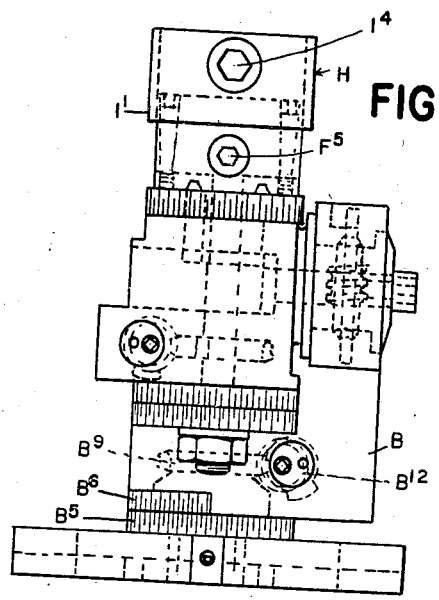
INVENTOR.
JOSEF A. DISSE
BY
Whittemore Hulbert & Belknap
ATTORNEYS April 29, 1947.                J. A. DISSE                2,419,887
                              UNIVERSAL VISE
                          Filed Sept. 13, 1943            3 Sheets-Sheet 3
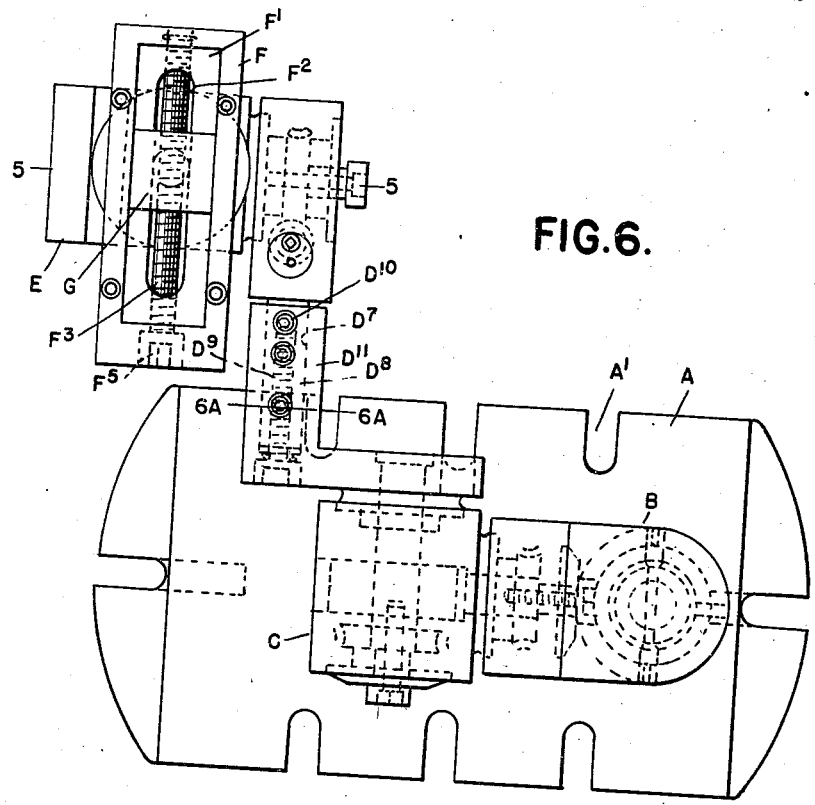
FIG.6.
FIG.6A.
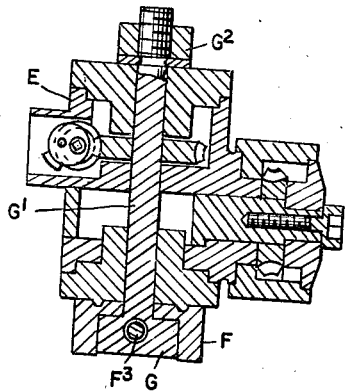
FIG.5.
INVENTOR.
JOSEF A. DISSE
BY
Whittemore Hulbert + Belknap
ATTORNEYS Patented Apr. 29, 1947

2,419,887

UNITED STATES PATENT OFFICE 2,419,887

UNIVERSAL VISE

Josef A. Disse, Detroit, Mich.

Application September 13, 1943, Serial No. 502,230

1 Claim. (Cl. 81—41)

The invention relates to a universal vise or work holder, and it is the object of the invention to obtain a construction more particularly designed for use in connection with machine tools and by which the work may be clamped in any desired angular relationship to the tool operating thereon. To this end, the invention consists, first, in a construction comprising a series of members having swivel engagement with each other successively in transverse planes. Second, in the means by which the members of the series may be angularly adjusted at each swivel connection and rigidly locked in adjusted position. Third, in the construction of the cooperating members of each swivel joint which is such that one member may be alternately mounted on reverse sides of the other member. Fourth, in various features of construction as hereinafter set forth.

In the drawings:

Figure 1 is a plan view of the universal vise showing some portions thereof in sections.

Figure 2 is a sectional side elevation.

Figure 3 is an end elevation.

Figure 4 is an enlarged section on line 4—4, Figure 2.

Figure 5 is an enlarged section on line 5—5, Figure 6.

Figure 6 is a plan view similar to Figure 1 but showing a different arrangement of the series of members.

Figure 6A is a cross section on line 6A—6A, Figure 6.

Figure 7 is an end elevation of the construction as arranged in Figure 6.

Figure 8 is a plan view of one of the elements detached and more specifically designated by the reference letter.

Figure 9 is a partial side elevation partly in section, Figure 8.

Figure 10 is a side elevation of the detachable cap for securing the worm in position; and Figure 11 is a cross section on line 11—11, Figure 10.

A is a base member, preferably of oblong form being rounded at its opposite ends. This member is provided with a series of slots A' in the opposite sides and ends of the peripheral portion thereof for engagement with clamping bolts or other securing means. It is also provided with a plurality of extended recesses A² on its underside for reception of keys A³, said bolts and keys being adapted to engage the usual key slots in the bed or table on which the vise is mounted. The base A is also formed of magnetic material so that, if desired, it may be rigidly secured in position by a magnetic chuck. B is an L-shaped angle member having a horizontal arm thereof provided with a swivel engagement with the base A. This, as shown, comprises a pin member B' having the lower portion thereof inserted in a flange socket member B² formed of non-magnetic material, which socket fits in a vertically extending aperture in the base. The pin and socket are both secured to the base by a cross pin B³ of non-magnetic material which is inserted through a transverse bore in said base having counter-bore enlargements B⁴ at opposite ends thereof. The peripheral flange of the socket member B² has scale graduations B⁵ thereon for cooperating with corresponding graduations B⁶ on the periphery of a portion of the member B. The socket member B² serves to break the magnetic circuit in case the base is mounted on a magnetic chuck.

The pin B' has an enlarged portion B⁷ above the socket B² which fits within a vertical bore in the horizontal arm of the member B. Above the portion B⁷ is a portion B⁸ reduced in diameter and having non-rotatively mounted thereon a worm-wheel B⁹ and a groove collar B¹⁰. A plurality of screws B¹¹ having conical inner end portions extend radially into the member B to engage the groove in the collar B¹⁰ and serve to clamp the member B down on the socket B² to prevent rotation of the swivel. B¹² is a worm operatively engaged with the worm-wheel B⁹ and adapted to actuate the same as hereinafter described. The vertical arm of the angle member B has a transverse bore B¹³ therethrough for forming a swivel engagement with a member C. The latter is in the form of a substantially rectangular block provided on one side with a projecting shank C' for engaging the bore B¹³. There is also a worm-wheel C² on this shank for engaging a worm C³ similar to the arrangement of the worm-wheel B⁹ and worm B¹². A flange collar C⁴ is secured to the end of the shank by a screw C⁵ and serves, when said screw is tightened, to clamp the parts and prevent rotation of the swivel.

The member C is further provided with a transverse bore C⁶ for receiving a swivel shank on one arm of an angle member D. The swivel connection is similar to that previously described, including a worm-wheel C⁷ on the shank and an operating worm C⁸ therefor. The member D has a second arm D' provided with a transverse bore D² for receiving the swivel shank of a block member E. This swivel connection is substantially the same as that previously described and as shown in Figures 8 to 11, the bore $D^2$ in the arm $D'$ has counterbored portions $D^3$ on opposite sides thereof. There is also a cutaway portion $D^4$ for receiving the worm and a detachable cap $D^5$ engaging a recess $D^6$ which permits assembly of the worm as hereinafter described. The member E, in addition to its swivel connection with the member D, is provided with a transverse bore for receiving a swivel connection to a member F. This member F forms a work supporting table and also a base for supporting a work clamp or vise proper when the latter is used. As shown in Fig. 5, the member F has a longitudinally extending recess $F'$ in its upper side to receive a rectangular head G provided with a shank $G'$ that extends through the bore in the member E being threaded at its outer end for engaging a clamping nut $G^2$. The member F is also longitudinally slotted at $F^2$ (Fig. 6) in the bottom of the recess for the passage of the shank $G'$ and for permitting relative adjustment of the members F and G. This adjustment is accomplished by a screw $F^3$ extending longitudinally within the recess and engaging a threaded bore in the member G. The outer end of this screw has a swivel connection $F^4$ to the member F and a wrench socket $F^5$ for rotating the same so that by such rotation the member F will be moved longitudinally with respect to the members G and E.

Work clamp

The work clamp or vise proper comprises a jaw member H which is detachably secured to the member F by taper pins $H'$. One end of the member H has the jaw $H^2$ and at its opposite end a flange or lug $H^3$. I is a movable jaw member having depending flanges $I'$ on its opposite sides embracing the member H to slide thereon. A screw $I^2$ swiveled at $I^3$ in the flange or lug $H^3$ and provided with a wrench socket $I^4$ threadedly engages the jaw member I and forms the adjustment means therefor. If desired the member I may be provided with an auxiliary jaw $I^5$ centrally pivoted at $I^6$ (Fig. 1) thereto so as to permit of angular adjustment with respect to the jaw $H^2$. The whole work clamp assembly is such that when the work is clamped between the jaws $H^2$ and $I^5$ by operation of the screw $I^2$, it may then be adjusted to be either concentric with or eccentric to the swivel axis by adjustment of the screw $F^3$.

With the construction as thus far described, it will be evident that the members B, C, D, E, and F form a series all mounted on the base A and having successive swivel engagements with each other. Consequently, the work clamp or vise may be positioned at any desired angle in relation to the base which is best adapted for receiving the work and holding the same in operative relation to the tool. It will also be observed that each swivel connection, with the exception of the one between the member B and the base, is reversible, so that the succeeding member of the series may be arranged alternatively on opposite sides of the preceding member. Each swivel connection is also provided with peripheral scale markings to facilitate adjustment thereof to any desired angle. Adjustment is effected by the worm and worm-wheel in each swivel joint, the worm wheel being non-rotatively mounted on the shank of the succeeding member, the worm being mounted in bearings in the preceding member. These bearings are preferably formed of integral eccentric bushing members J (Fig. 4) engaging opposite ends of the work shank and sockets in the member in which the worm is mounted. The worm shank has a wrench hold $J'$ for the turning of the worm to operate the worm-wheel and the swivel shank. There is also a socket wrench hold $J^2$ in each of the bushings J which when engaged by an operating wrench simultaneously with engagement with the wrench hold $J'$, permits of rotating said bushings so as to clamp the worm against the worm-wheel. This will prevent any accidental turning of the worm after the swivel has been properly adjusted thereby. However, additional security is obtained by a set screw $J^8$ which is tightened when the parts are properly positioned. As specifically shown in Figure 4, the wrench hold $J'$ is at the end of a shaft $J^3$ which passes through the bushing J and the worm $J^4$ between the same. A bridge $J^5$ integrally connects the bushings J so that they revolve together when adjusted about their eccentric axis. Cross pins $J^6$ engaging grooves $J^7$ in the shaft $J^3$ hold the latter from axial displacement. For permitting the mounting of the worm assembly in the various swiveling elements of the structure, detachable caps are provided such as the cap $D^5$ illustrated in Figures 10 and 11.

In the modified construction illustrated in Figures 6 and 7 the angle member $D^a$ has its arm $D''$ extensible. As shown in Figure 6 and Figure 6A, this arm has a longitudinally extending recess $D^7$ for receiving the shank $D^8$ of the extension member, the latter being of the construction illustrated in Figures 8 and 9. A screw $D^9$ swiveled at the lower end of the arm $D''$ and extending into the recess $D^7$ engages a threaded socket in the shank $D^8$ and serves as an adjusting means for extending or contracting the length of said arm $D''$. Set screws $D^{10}$ on opposite sides of the recess $D^7$ serve to rigidly hold the parts in adjusted position.

Operation

The base A is first mounted on the table of a machine tool, or in any other position for use, either by clamping bolts or by the use of a magnetic chuck. It may also be accurately positioned on said table by keys $A^3$ inserted in the recesses $A^2$ and slots in the table. The operator can then adjust the work clamp so as to hold the work in any desired plane for engagement with the operating tool. Such adjustment is facilitated by reason of the fact that each of the successive swiveled members of the structure can be rotated to any desired angle and then clamped to be rigid with the adjacent members. Also, as previously stated, each succeeding swiveled member may be alternatively positioned on opposite sides of the preceding member. One such adjustment is illustrated in Figures 1 and 2. A different adjustment is illustrated in Figures 6 and 7. Also, in Figure 7 the arrangement of the work clamp or vise is shown in dotted lines in two different positions to respectively hold the work in planes which are perpendicular to each other. It is obvious that the same elements are capable of adjustment into a great variety of different positions according to the requirements of the work.

The bushing $B^2$ of non-magnetic material, together with a pin $B^3$ also of non-magnetic material, serves to break any magnetic circuit between the base A and the members mounted thereon. However, it may be desirable to include the superposed members in the magnetic circuit and for this purpose an adjustable bridge member K is pivotally mounted on one side of the member B. This, as shown in full lines, Figure 2, is turned so as to be separated from the base A, while in dotted lines, it is turned down to contact with said base.

What I claim as my invention is:

A universal vise or work holder comprising a base, a work clamp, a series of members between said base and work clamp having swivel engagements with each other successively in transverse planes to locate said clamp in a selected one of a plurality of positions having clearance above said base, each swivel engagement being formed by a shank on one member rotatably engaging a transverse bore in the adjacent member, a worm-wheel located within said bore on said shank, a worm in mesh with said worm-wheel, an eccentric bushing in which said worm is journaled located in a transverse bore in said bored member, a wrench hold for rotating said worm and a wrench hold for rotating said eccentric bushing to lock said worm and worm-wheel from movement.

JOSEF A. DISSE.

REFERENCES CITED

The following references are of record in the file of this patent:

UNITED STATES PATENTS

| Number | Name | Date |
|---|---|---|
| 772,894 | LeBlond et al. | Oct. 18, 1904 |
| 2,109,033 | Ransome | Feb. 22, 1938 |
| 518,750 | Blue | Apr. 24, 1894 |
| 1,818,501 | Odin | Aug. 11, 1931 |
| 1,511,298 | Petzold | Oct. 14, 1924 |
| 954,961 | Higham et al. | Apr. 12, 1910 |
| 1,731,468 | Lind | Oct. 15, 1929 |
| 650,644 | Koeppen | May 29, 1900 |
| 776,126 | Edlund | Nov. 29, 1904 |
| 1,269,271 | Fegley et al. | June 11, 1918 |
| 1,440,167 | Ober | Dec. 26, 1922 |
| 1,514,160 | Johnson | Nov. 4, 1924 |
| 755,403 | Sipe | Mar. 22, 1904 |
| 814,101 | Weel | Mar. 6, 1906 |
| 809,432 | Darrschmidt | Jan. 9, 1906 |
| 2,321,503 | Moran | June 8, 1943 |
| 173,706 | Woolson | Feb. 15, 1876 |

FOREIGN PATENTS

| Number | Country | Date |
|---|---|---|
| 401,064 | French | May 5, 1909 |
| 724,318 | French | Jan. 25, 1932 |

OTHER REFERENCES

No. 4330A, page 212, Catalog of the W. M. Welch Scientific Co.